United States Patent
Su

[11] Patent Number: 6,036,325
[45] Date of Patent: Mar. 14, 2000

[54] REARVIEW MIRROR ASSEMBLY

[76] Inventor: Ru-Sheng Su, 10, Lane 170, Jou Gong St., Yen Jou Tsun, Yung Kang Hsiang, Tainan Hsien, Taiwan

[21] Appl. No.: 09/206,603

[22] Filed: Dec. 7, 1998

[51] Int. Cl.⁷ .............................. G02B 7/182; B60R 1/06
[52] U.S. Cl. ........................ 359/871; 359/872; 248/475.1
[58] Field of Search ........................... 359/841, 871, 359/872, 881; 248/475.1, 476, 478, 479, 483, 900

[56] References Cited

U.S. PATENT DOCUMENTS

| | | | |
|---|---|---|---|
| 4,422,724 | 12/1983 | Otsuka et al. | 248/475.1 |
| 4,592,529 | 6/1986 | Suzuks | 248/475.1 |
| 4,905,954 | 3/1990 | Taylor | 248/475.1 |
| 4,919,525 | 4/1990 | Gilbert | 359/841 |
| 4,957,259 | 9/1990 | Kruse et al. | 359/872 |
| 4,981,279 | 1/1991 | Andreas et al. | 359/872 |
| 5,124,846 | 6/1992 | Seitz et al. | 359/841 |
| 5,327,294 | 7/1994 | Koske et al. | 359/871 |
| 5,889,624 | 3/1999 | Dickenson | 359/841 |

FOREIGN PATENT DOCUMENTS

| | | | |
|---|---|---|---|
| 2671036 | 7/1992 | France | 359/871 |
| 62-234755 | 10/1987 | Japan | 359/871 |

*Primary Examiner*—Ricky D. Shafer
*Attorney, Agent, or Firm*—Alan Kamrath; Oppenheimer, Wolff & Donnelly LLP

[57] ABSTRACT

A rearview mirror assembly has a base plate, a support seat disposed on the base plate, and a rearview mirror device disposed on the support seat. The base plate has a recess, and two through holes. Two bolts fasten the base plate and the support seat together. Two screws fasten the support seat and the rearview mirror device together. A spring is disposed in the rearview mirror device. A rod is disposed in the rearview mirror device to position the spring.

1 Claim, 8 Drawing Sheets

REARVIEW MIRROR ASSEMBLY

BACKGROUND OF THE INVENTION

The present invention relates to a rearview mirror assembly. More particularly, the present invention relates to a rearview mirror assembly which is suitable for various automobiles.

Referring to FIG. 8, a first conventional rearview mirror device has a rearview mirror 10, a protection pad 30, a connection seat 20 disposed between the rearview mirror 10 and the protection pad 30, a base plate 40 disposed on the protection pad 30, and a plurality of fastener elements 50 fastening the base plate 40, the protection pad 30, and the connection seat 20 together.

Referring to FIG. 9, a second conventional rearview mirror device has a rearview mirror 60, a protection pad 80, and a base seat 70 disposed between the rearview mirror 60 and the protection pad 80.

Since various rearview mirror devices have various sizes of elements and various kinds of elements, the manufacture should prepare many different spare parts to be stored.

SUMMARY OF THE INVENTION

An object of the present invention is to provide a rearview mirror assembly which is suitable for various automobiles.

In accordance with a preferred embodiment of the present invention, a rearview mirror assembly comprises a base plate, a support seat disposed on the base plate, and a rearview mirror device disposed on the support seat. The base plate has a recess, and two through holes. Two bolts pass through the through holes to fasten the base plate and the support seat together. Two screws fasten the support seat and a bottom of the rearview mirror device together. A spring is disposed in the rearview mirror device. A rod is disposed in the rearview mirror device to position the spring.

In accordance with another preferred embodiment of the present invention, a rearview mirror assembly comprises a base plate, a support seat disposed on the base plate, and a rearview mirror device disposed on the support seat. The support seat has a lug, a protruded portion, and a blocking portion. A positioning plate is disposed on the protruded portion of the support seat. A stud fastens the positioning plate and the support seat together. Two bolts fasten the base plate and the support seat together. Two screws fasten the support seat and the rearview mirror device together. A spring is disposed in the rearview mirror device. A rod is disposed in the rearview mirror device. The spring hooks the lug and the rod.

DETAILED DESCRIPTION OF THE INVENTION

Figure 1:
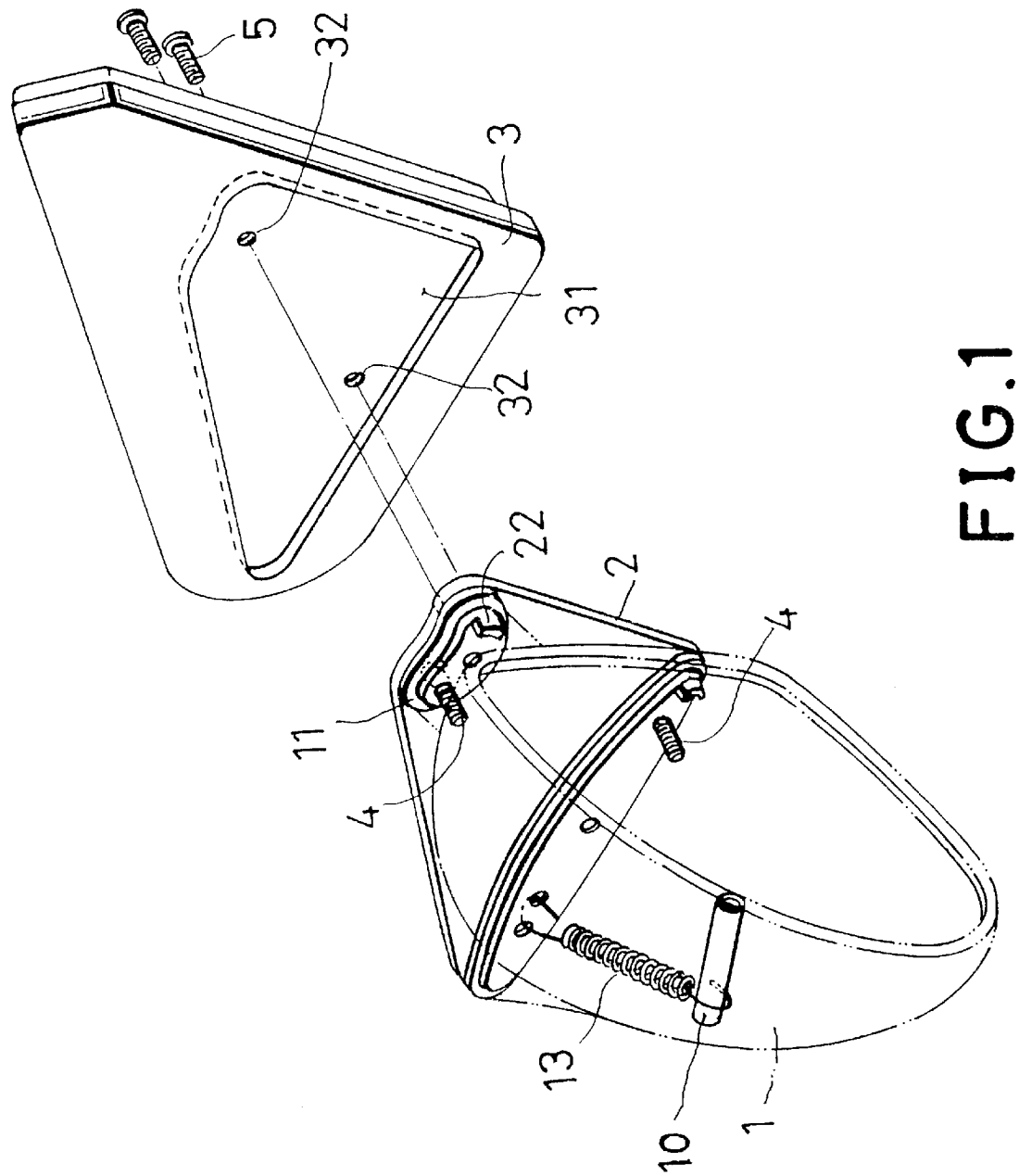
FIG. 1 is a perspective exploded view of a rearview mirror assembly of a preferred embodiment in accordance with the present invention.
Figure 2:
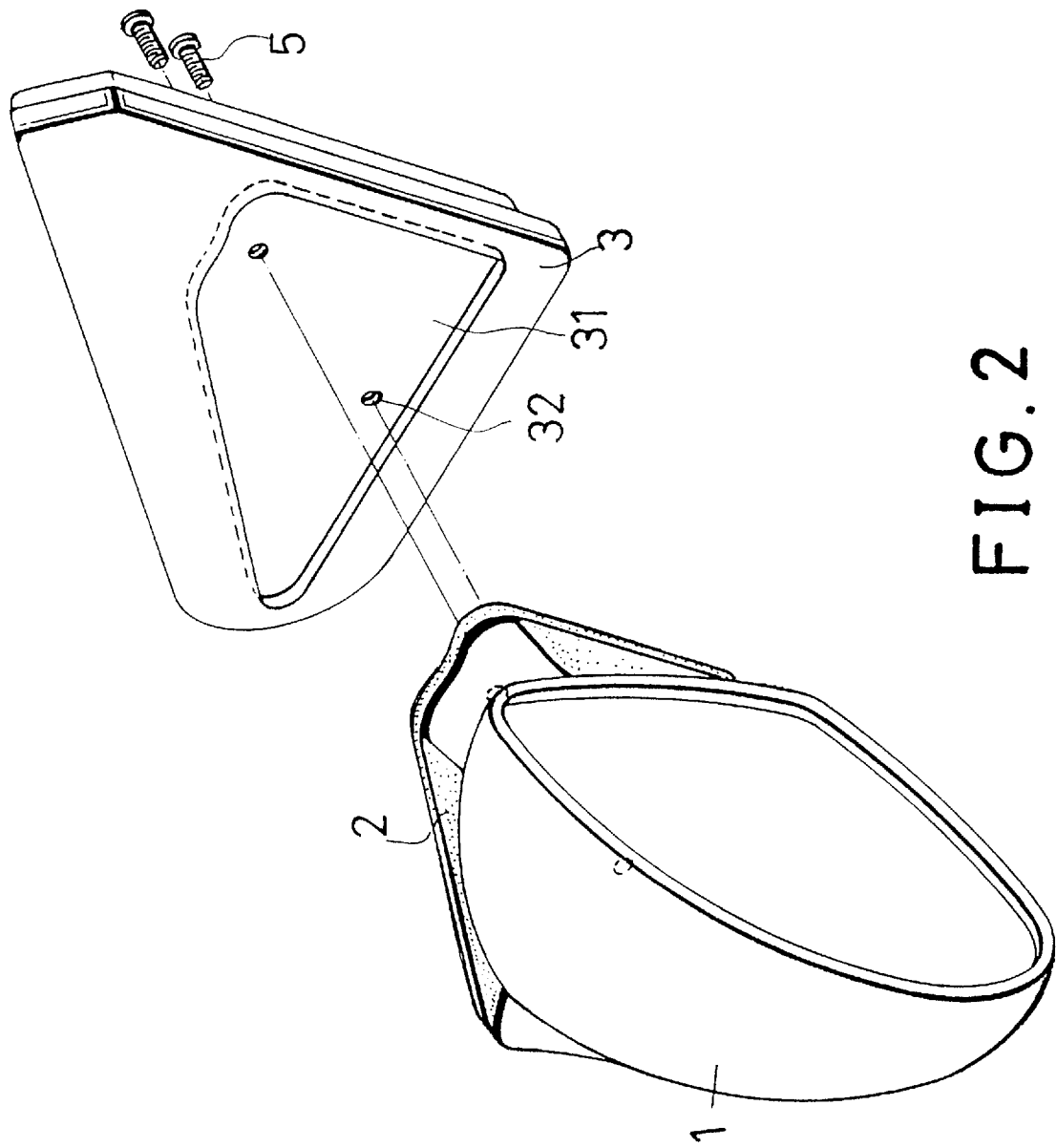
FIG. 2 is another perspective exploded view of a rearview mirror assembly of a preferred embodiment in accordance with the present invention.
Figure 3:
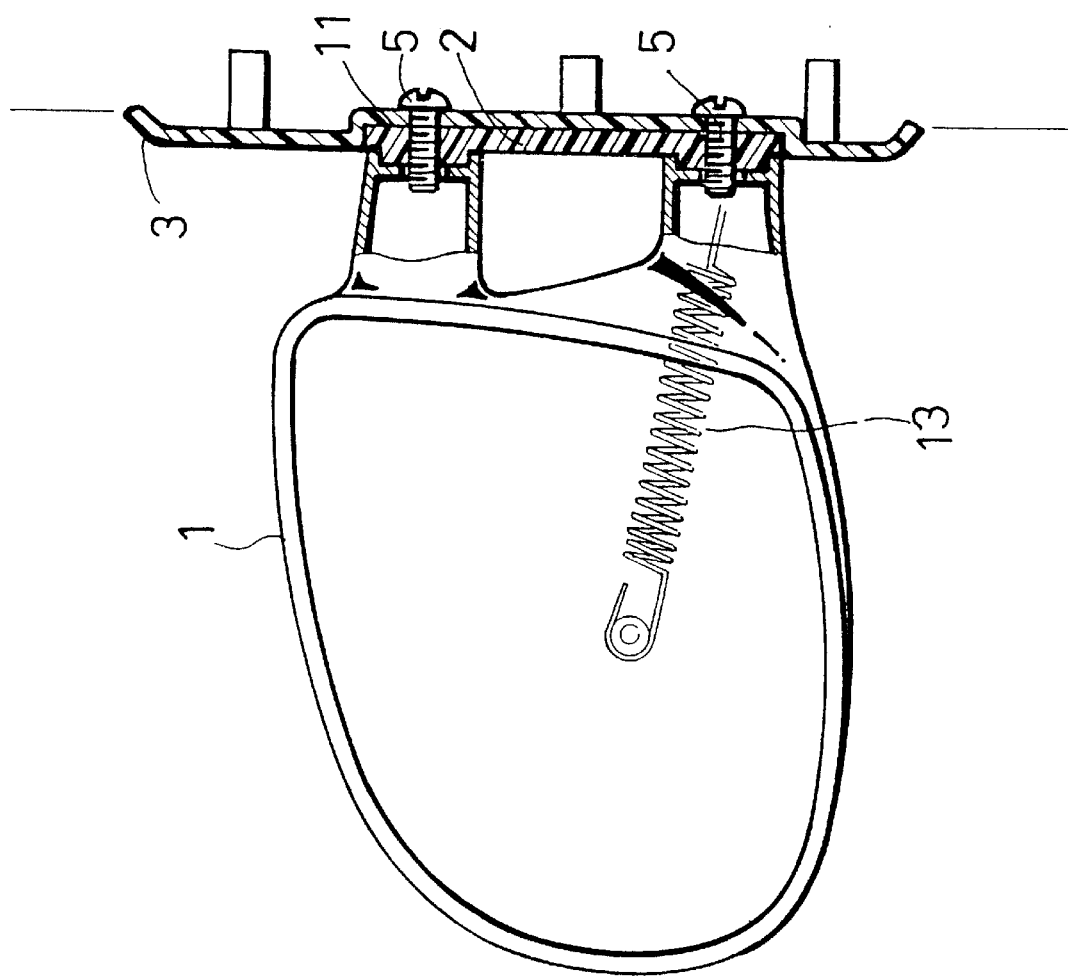
FIG. 3 is a sectional assembly view of a rearview mirror assembly of a preferred embodiment in accordance with the present invention.
Figure 4:
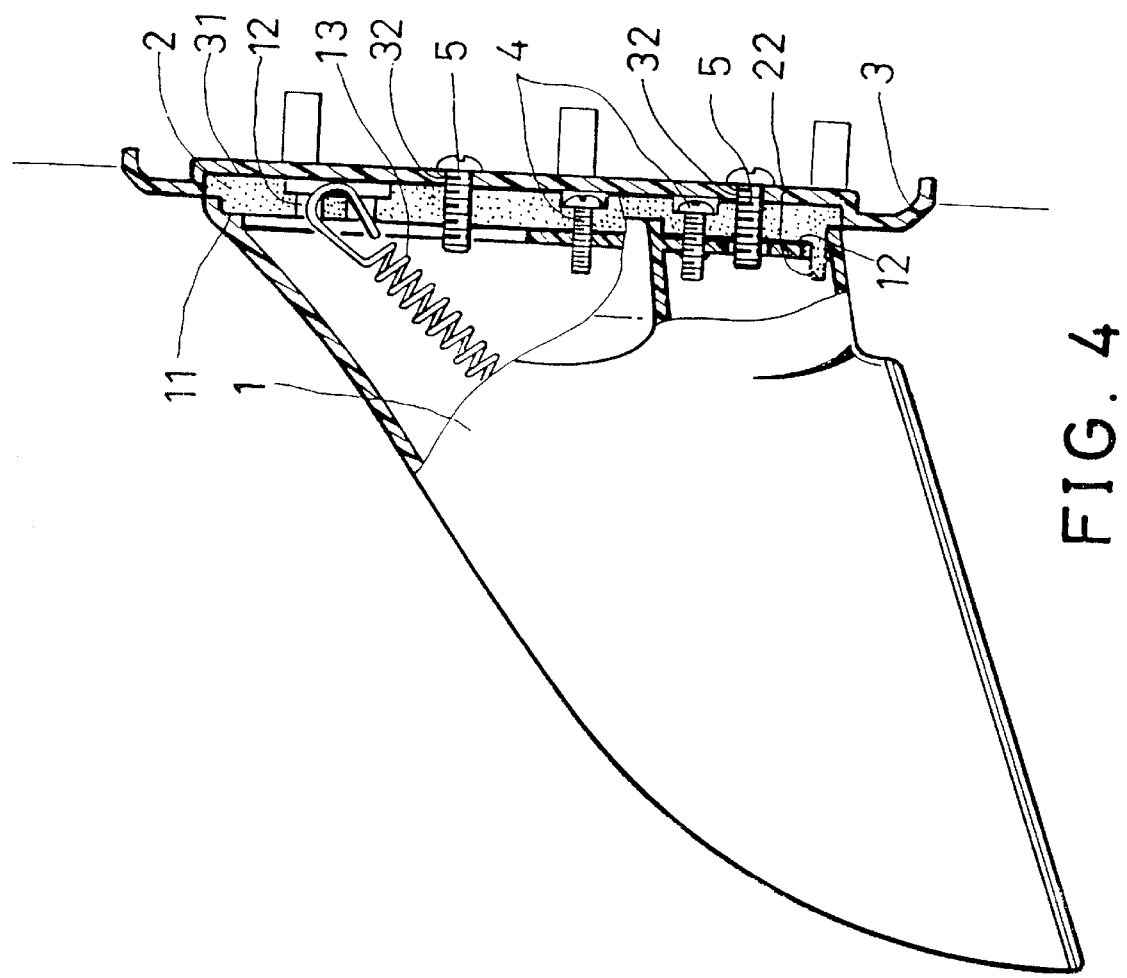
FIG. 4 is another sectional assembly view of a rearview mirror assembly of a preferred embodiment in accordance with the present invention.

Referring to FIGS. 1 to 4, a first rearview mirror assembly comprises a base plate 3, a support seat 2 disposed on the base plate 3, and a rearview mirror device 1 disposed on the support seat 2.

The support seat 2 having apertures 12 and a blocking portion 22.

The base plate 3 has a recess 31, and two through holes 32.

Two bolts 5 pass through the through holes 32 to fasten the base plate 3 and the support seat 2 together.

Two screws 4 fasten the support seat 2 and a bottom 11 of the rearview mirror device 1 together.

A spring 13 is disposed in the rearview mirror device 1. A rod 10 is disposed in the rearview mirror device 1 to position the spring 13.

Figure 5:
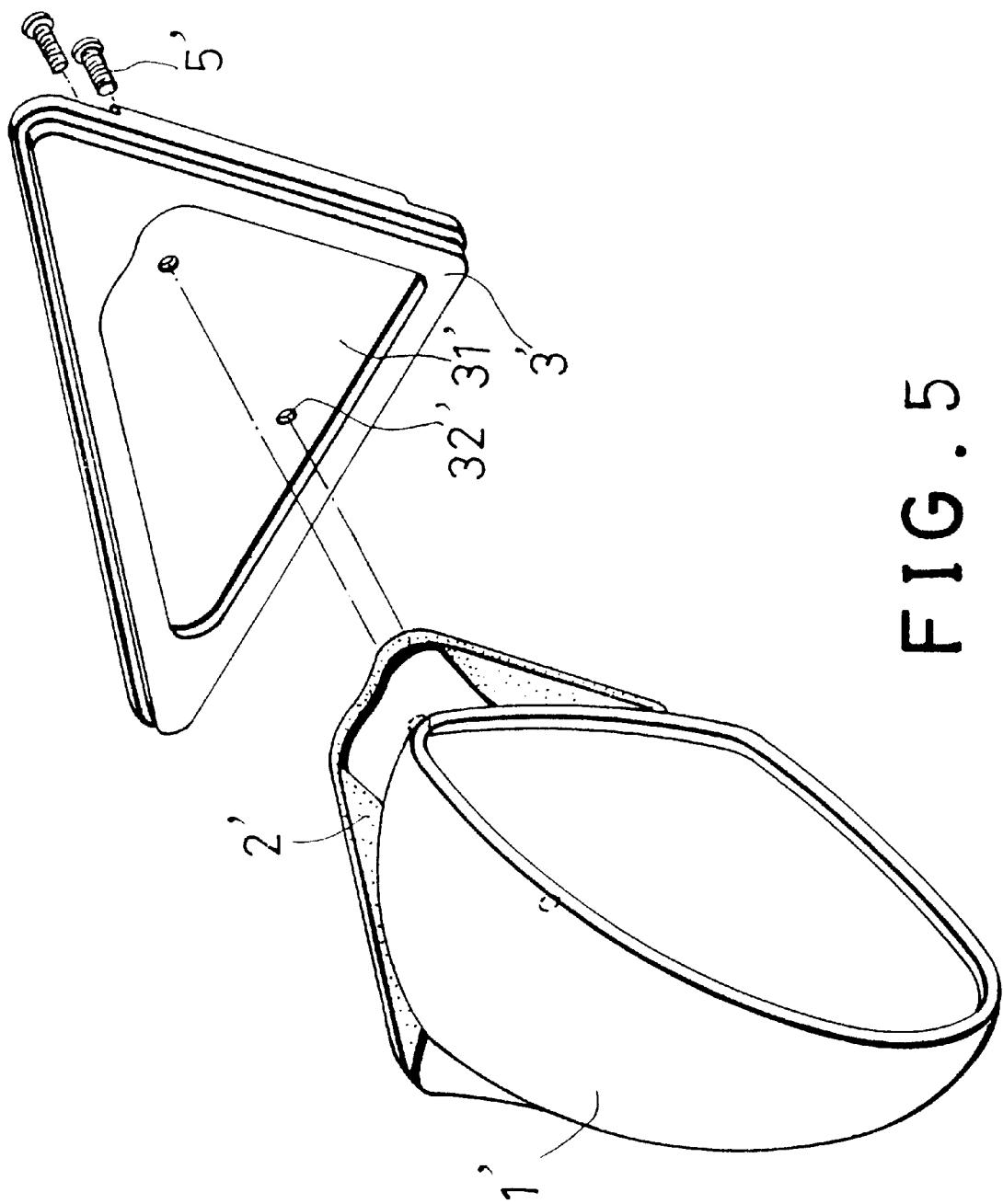
FIG. 5 is a perspective exploded view of a rearview mirror assembly of another preferred embodiment in accordance with the present: invention.
Figure 6:
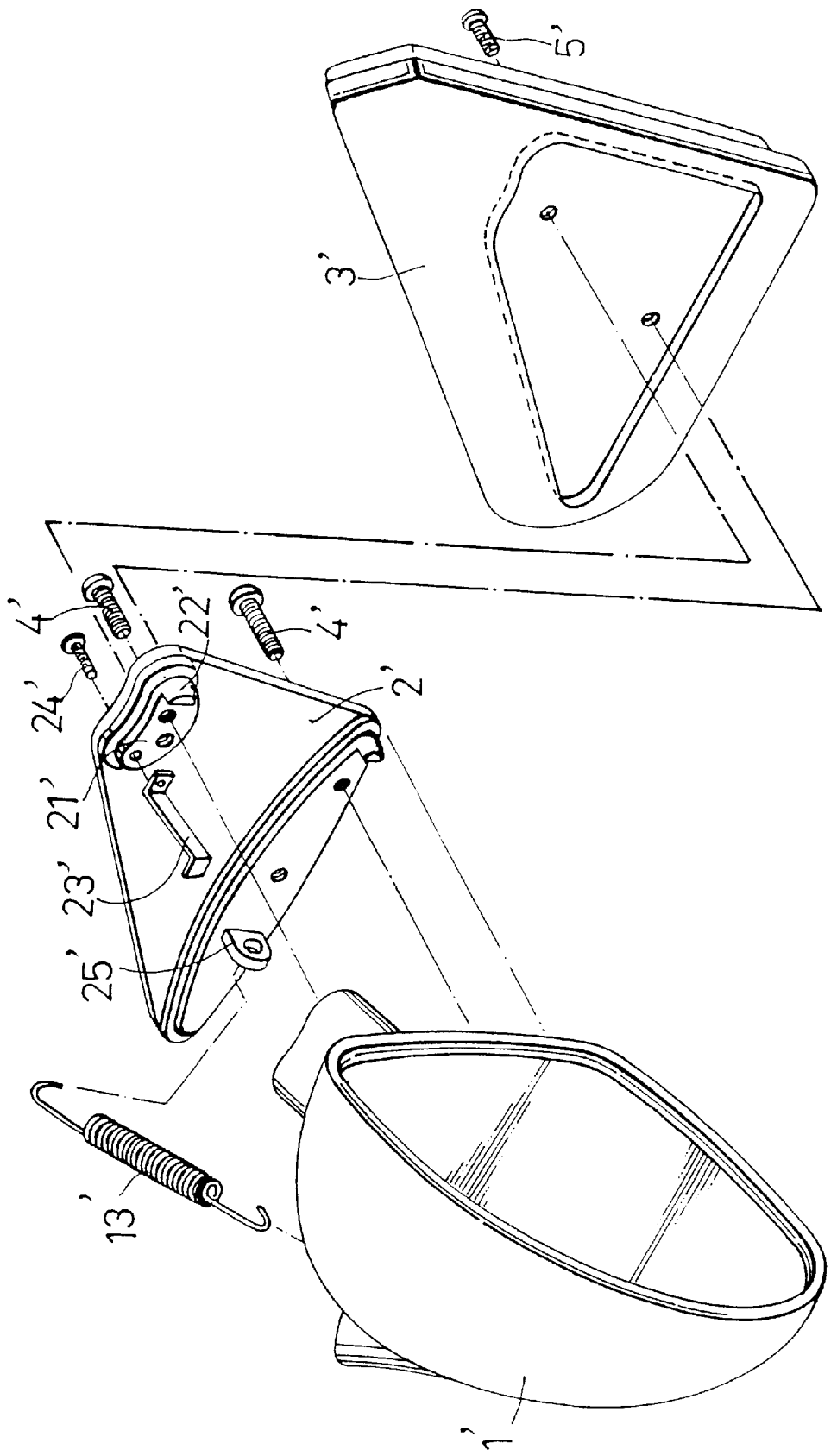
FIG. 6 is another perspective exploded view of a rearview mirror assembly of another preferred embodiment in accordance with the present invention.
Figure 7:
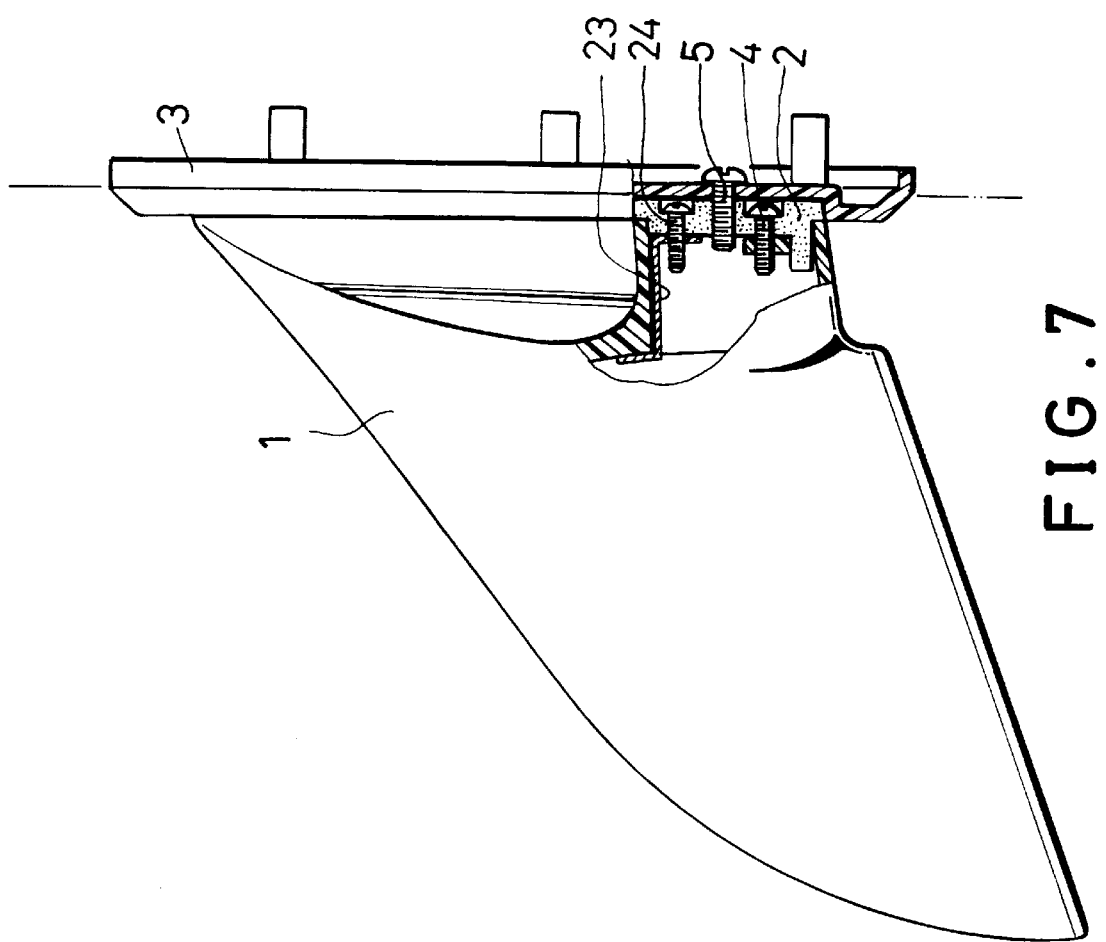
FIG. 7 is a sectional assembly view of a rearview mirror assembly of another preferred embodiment in accordance with the present invention.
Figure 8:
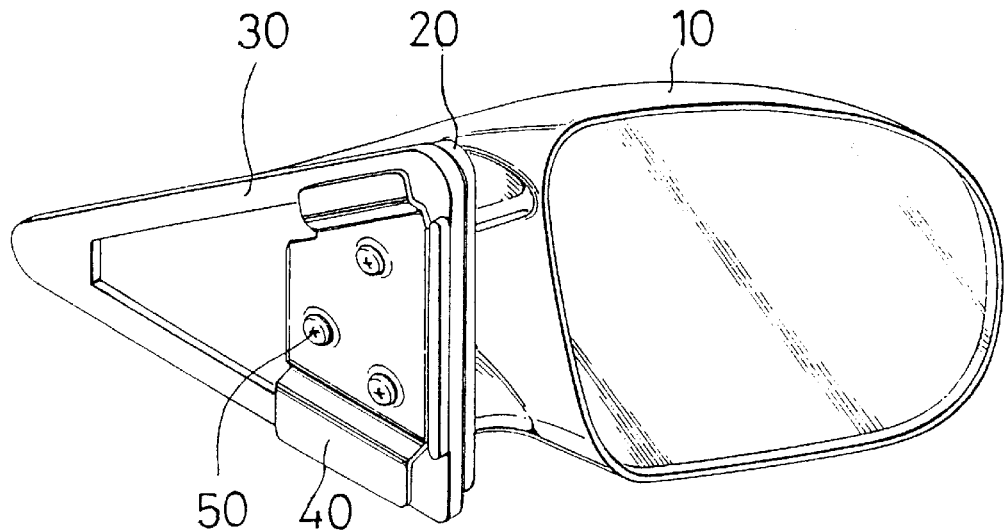
FIG. 8 is a perspective view of a rearview mirror device of a first prior art.
Figure 9:
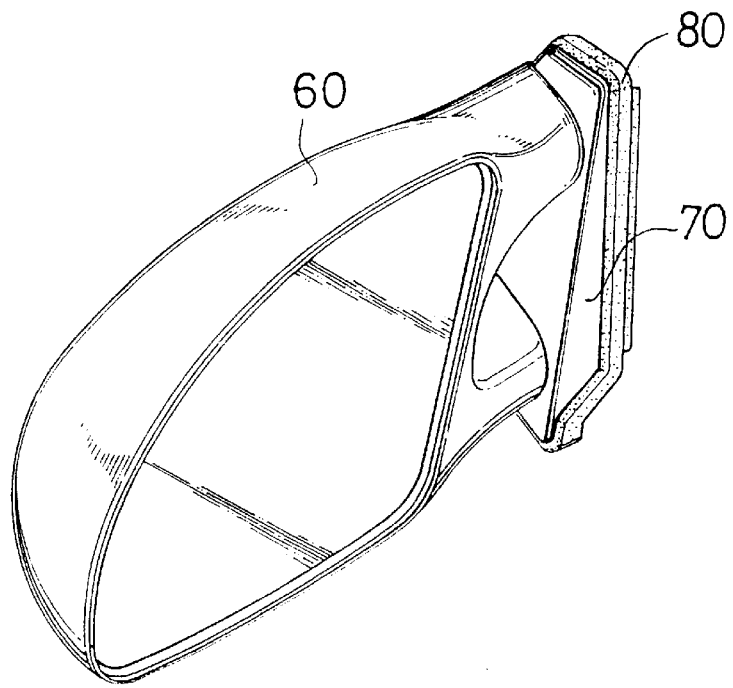
FIG. 9 is a perspective view of a rearview mirror device of a second prior art.

Referring to FIGS. 5 to 7, a second rearview mirror assembly comprises a base plate 3' having a recess 31' and two through holes 32', a support seat 2' disposed on the base plate 3', and a rearview mirror device 1' disposed on the support seat 2'.

The support seat 2' has a lug 25', a protruded portion 21', and a blocking portion 22'.

A positioning plate 23' is disposed on the protruded portion 21' of the support seat 2'.

A stud 24' fastens the positioning plate 23' and the support seat 2' together.

Two bolts 5' fasten the base plate 3' and the support seat 2' together.

Two screws 4' fasten the support seat 2' and the rearview mirror device 1' together.

A spring 13' is disposed in the rearview mirror device 1'. The spring 13' hooks the lug 25'. A rod (not shown in the figures) is disposed in the rearview mirror device 1' to position the spring 13'.

The invention is not limited to the above embodiment but various modification thereof may be made. Further, various changes in form and detail may be made without departing from the scope of the invention.

I claim:

1. A rearview mirror assembly comprising:

a base plate, a support seat disposed on the base plate, a rearview mirror device disposed on the support seat,
the support seat having a lug, a protruded portion, and a blocking portion, a positioning plate disposed on the protruded portion of the support seat, a stud fastening the positioning plate and the support seat together, two bolts fastening the base plate and the support seat together, two screws fastening the support seat and the rearview mirror device together, a spring disposed in the rearview mirror device, a rod disposed in the rearview mirror device, and the spring hooking the lug and the rod.

\* \* \* \* \*